United States Patent [19]
Halimi et al.

[11] Patent Number: 5,605,045
[45] Date of Patent: Feb. 25, 1997

[54] TURBOCHARGING SYSTEM WITH INTEGRAL ASSISTING ELECTRIC MOTOR AND COOLING SYSTEM THEREFOR

[75] Inventors: Edward M. Halimi, Montecito; Ralph P. Maloof, Calabasas; William E. Woollenweber, Carlsbad, all of Calif.

[73] Assignee: Turbodyne Systems, Inc., Carpinteria, Calif.

[21] Appl. No.: 529,672

[22] Filed: Sep. 18, 1995

[51] Int. Cl.⁶ .................................................. F02B 37/10
[52] U.S. Cl. ........................... 60/607; 310/52; 415/177; 417/407
[58] Field of Search ................... 60/607, 608; 310/54, 310/58, 52, 60 A, 156; 415/177; 417/407

[56] References Cited

U.S. PATENT DOCUMENTS

| | | | |
|---|---|---|---|
| 2,173,489 | 9/1939 | Voigt | 417/407 |
| 2,578,785 | 12/1951 | Davis | 417/407 |
| 2,829,286 | 4/1958 | Britz | 310/54 |
| 3,163,790 | 12/1964 | White | 310/54 |
| 3,961,199 | 6/1976 | Bronicki | 60/607 |
| 4,708,602 | 11/1987 | McEachern et al. | 417/407 |
| 5,074,115 | 12/1991 | Kawamura | 60/608 |
| 5,121,605 | 6/1992 | Oda et al. | 60/608 |

FOREIGN PATENT DOCUMENTS 59-49323  3/1984  Japan ..................................... 417/407

*Primary Examiner*—Michael Koczo
*Attorney, Agent, or Firm*—Allan M. Shapiro

[57] ABSTRACT

An exhaust gas-driven turbine drives a compressor to charge an internal combustion engine. An integral motor is positioned on the connecting shaft to add power to the turbocharging shaft, especially at low exhaust gas volume. Cooling for this motor includes circulation of engine oil therearound and may include insulation to limit heat inflow from the turbine and may include air flow through the motor to carry away heat inflow from the turbine.

40 Claims, 3 Drawing Sheets

TURBOCHARGING SYSTEM WITH INTEGRAL ASSISTING ELECTRIC MOTOR AND COOLING SYSTEM THEREFOR

FIELD OF THE INVENTION

This invention is directed to internal combustion engine exhaust gas-driven turbochargers and particularly to the use of an integral electric motor to boost output at low exhaust gas volume.

BACKGROUND OF THE INVENTION

In order to increase the power output of an internal combustion engine of a particular displacement volume, additional air can be supplied by compressing the air by means of a turbocharger. Additional air permits the burning of more fuel to produce increased power output.

At very low engine speed such as, for example, at low idle, there is insufficient exhaust gas energy to drive the turbocharger fast enough to produce significant levels of boost. Consequently, there is an appreciable lag time between opening of the engine throttle and when the turbocharger is running fast enough to produce enough boost pressure to eliminate smoke on acceleration. Fuel control devices, such as rack limiters or aneroid controls, are employed to limit the amount of fuel delivered to the engine cylinders until the turbocharger is capable of delivering sufficient air to produce smoke-free combustion. These fuel limiting devices cause slower response to throttle opening and a sluggishness in engine and vehicle response.

There is need for boosting the output of an exhaust gas-driven turbocharger during those times when an increase in engine output power is required.

SUMMARY OF THE INVENTION

In order to aid in understanding this invention, it can be stated in essentially summary form that it is directed to an exhaust gas-driven turbocharger which has an integral electric motor to maintain compressor speed at low exhaust gas flow rates in order to supply sufficient engine air to eliminate uncombusted hydrocarbons and exhaust smoke and to boost power early in the acceleration mode. The invention includes structure to limit the upper temperatures of the motor and to limit heat flow to the motor.

It is a purpose and advantage of this invention to supply power to a turbocharger which is driven by exhaust gas expansion by including an integrated motor to supply torque to aid in rotating the shaft in the same direction as exhaust gas expansion.

It is a further purpose and advantage of this invention to provide an exhaust gas-driven turbocharger with an internal electric motor with provisions to cool the motor so as to limit motor temperature during and after operation.

It is a further purpose and advantage of this invention to provide thermal insulation between the exhaust gas turbine and the electric motor to limit heat flow from the exhaust gas turbine to the electric motor both during operation and subsequent to operation.

It is another purpose and advantage of this invention to provide an exhaust gas-driven compressor with air flow in a direction from the internal motor to the exhaust gas turbine to remove heat from the structure around the electric motor.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

DESCRIPTION OF THE PREFERRED EMBODIMENT

Figure 1:
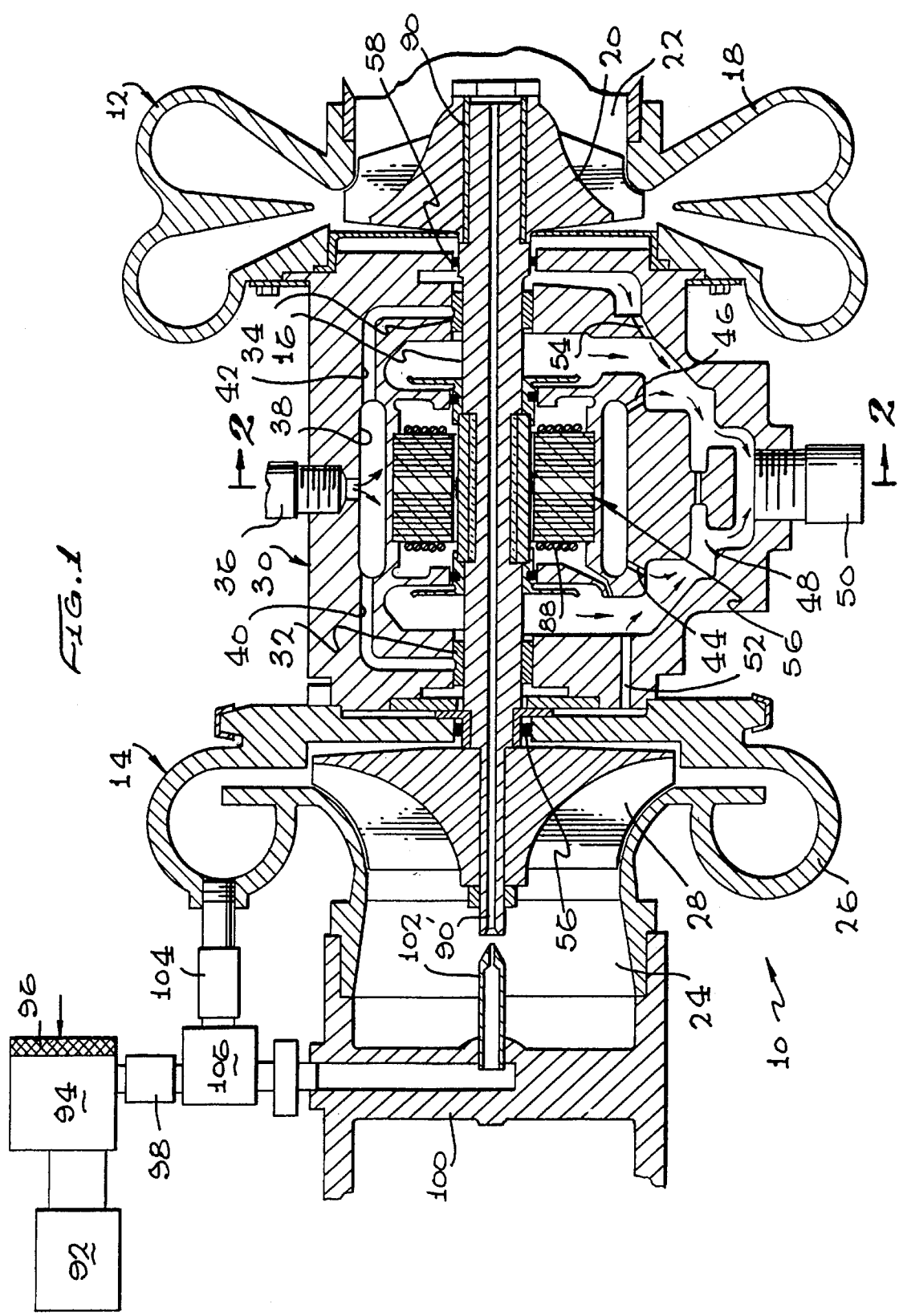
FIG. 1 is a longitudinal section through the gas turbine and air compressor of an automotive exhaust gas-driven turbocharger, and through the bearing and motor housing, showing the internal electric motor positioned between the bearings in the bearing housing.

The turbocharging system of this invention is generally indicated at 10 in FIG. 1. The gas turbine 12 and the air charging compressor 14 are mostly shown in a longitudinal section on the center line of their connecting shaft 16. The gas turbine has an inlet scroll 18 which is connected to receive the exhaust gas from an internal combustion engine, such as a diesel engine. Impeller 20 is mounted on shaft 16 and expands the exhaust gas. The waste exhaust gas is exhausted out of exhaust pipe 22. The impeller 20 imparts torque to the shaft 16 and rotates the shaft.

At the other end of the shaft, air intake 24 receives air from the outside after passing through an air filter or the like, which removes the larger physical contaminants. The air intake 24 is part of the turbocharger, which includes scroll 26. Compressor impeller 28 is mounted on shaft 16 and rotates therewith. The rotation of the compressor impeller compresses the intake air which is delivered by the scroll, sometimes through an intercooling heat exchanger, to the internal combustion engine.

Figure 2:
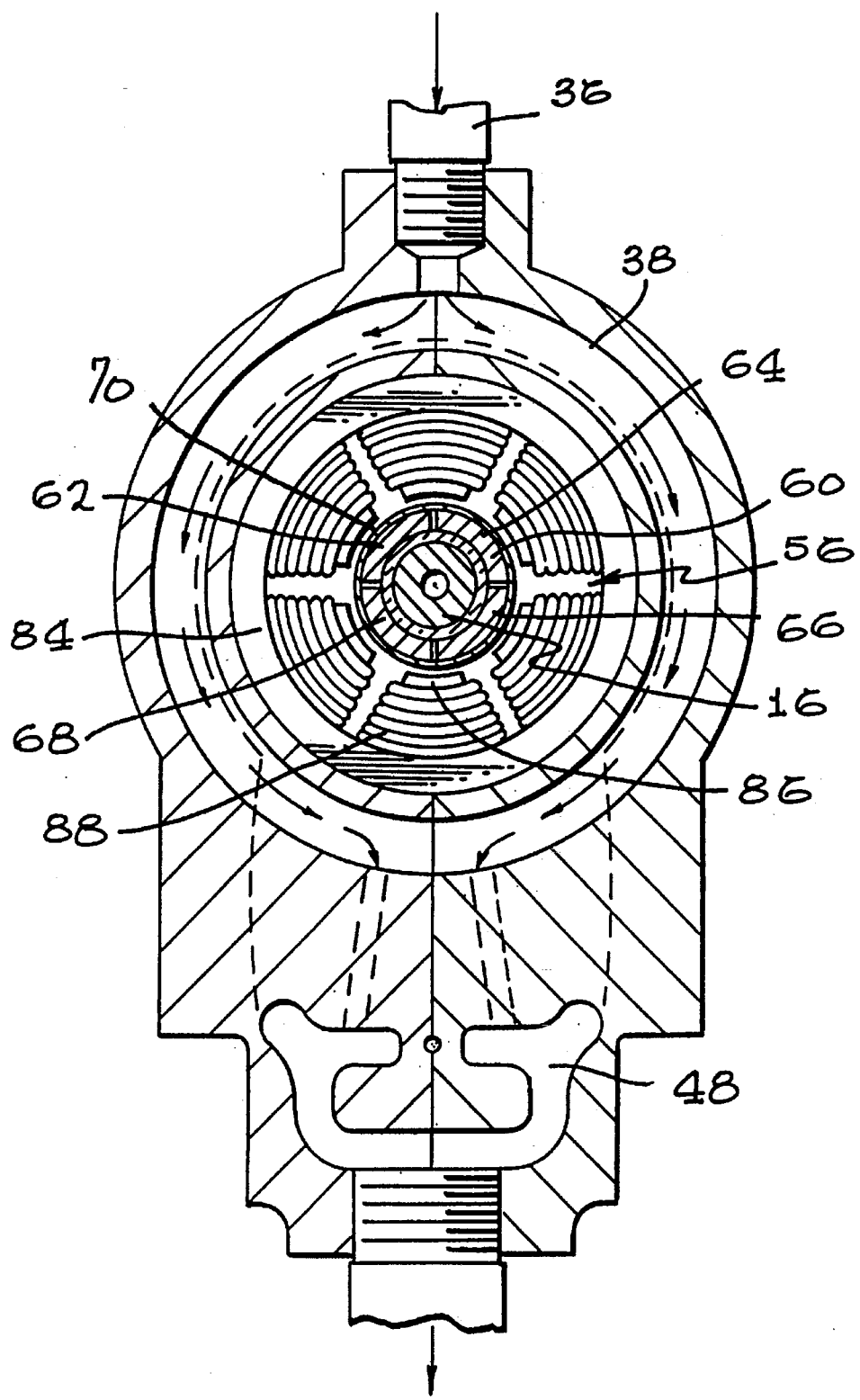
FIG. 2 is an enlarged transverse section taken generally along line 2—2 of FIG. 1.
Figure 3:
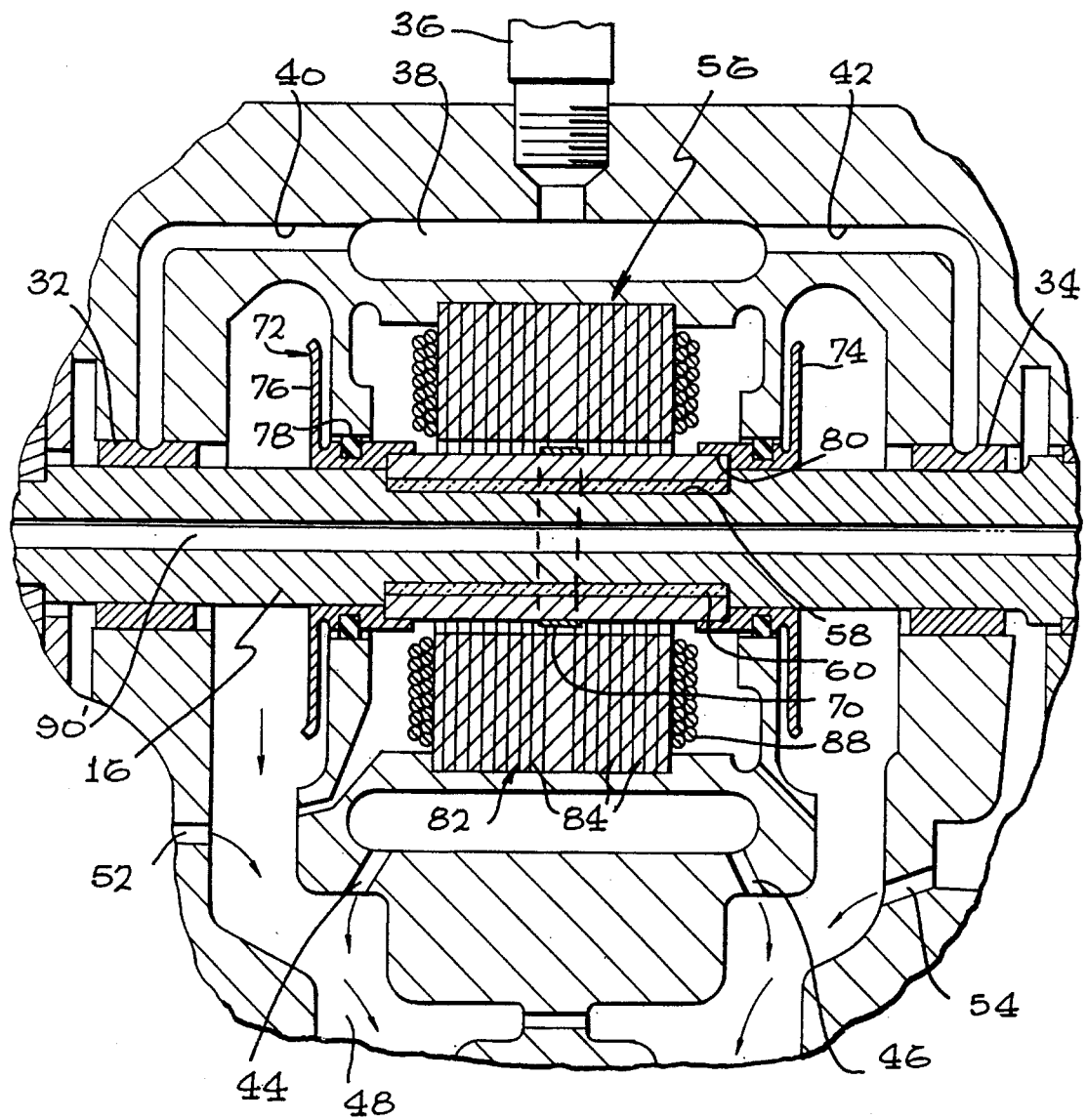
FIG. 3 is an enlarged detail of the motor and its surrounding structure.

A bearing and motor housing, indicated generally at 30, is a divided housing, as seen in FIG. 2, for ease of assembly of the internal parts. However, housing 30 is shown in section in FIG. 1 for clarity of illustration. Bearing 32 and bearing 34 embrace the shaft 16 substantially at the ends of the bearing housing 30. It is desirable that the bearings be spaced as far apart as possible to provide shaft stability. In addition to supporting the bearings, both the compressor scroll 26 and the turbine scroll 18 are mounted on the bearing housing 30. Oil inlet 36 delivers engine oil to the bearing housing where it enters annular oil passage 38. Lubrication oil to the bearings 32 and 34 is provided from the annular oil passage 38 by bearing oil passages 40 and 42. Much of the structure is also seen in FIGS. 2 and 3. The annular oil passage 38 has drain openings 44 and 46 to drain chamber 48, which has an outlet connection 50 for return of the oil to the engine for recycling. The oil escaping the bearings 32 and 34 toward the interior of the bearing housing flows directly into drain chamber 48. The oil moving outwardly from the drain chamber from the bearings is returned to the drain chamber through return passages 52 and 54. The shaft has seals at 56 and 58 to prevent the oil from getting out into the compressor and expander.

As discussed above, at very low engine speed, for example, at idle, there is insufficient exhaust gas energy to drive the turbocharger fast enough to produce significant levels of boost. Consequently, there is an appreciable lag time between opening of the engine throttle and when the turbocharger is running fast enough to produce enough boost pressure to eliminate smoke on acceleration. To overcome the problem of having the compressor run too slowly, electric motor 56 is mounted in the bearing housing between the bearings therein with its rotor mounted on shaft 16. A preferred type of electric motor is one having permanent magnets in the rotor in order to avoid the problems of commutation at the high speeds expected of the motor. As seen in FIG. 3, shaft 16 has a reduced diameter neck 58 into which thermal insulation 60 is placed. Four magnets 62, 64, 66 and 68 are placed around the insulation (see FIG. 2). The magnets are slightly separated from each other to prevent the pole ends from abutting. The magnets are shaped as the longitudinal segments of a cylindrical tube. The length of the magnets is such as to fill the neck 58. Collar 70 is tensioned around the center of the magnets to help them withstand the high centrifugal force.

Oil slinger structure 72, shown on the left side of the motor, and its companion oil slinger structure 74, shown on the right side of the motor, each performs three functions. Oil slinger disc 76 keeps the oil away from the motor. In addition, seal 78 keeps the oil from the motor. Furthermore, the collar of the oil slinger structure which embraces the shaft 16 has a recess 80 which embraces the ends of the magnets. Thus, the collar of the oil slinger structure embraces around the outside of the magnets to hold the ends in place, both longitudinally and radially.

The stator 82 of the electric motor 56 comprises a plurality of laminations, such as lamination 84, of suitable magnetically permeable material. As is seen in FIG. 2, the laminations are formed to define six poles such as pole 86. The poles carry windings, such as winding 88 on pole 86. These windings are electrically connected exteriorly of the motor and can be appropriately selectively, progressively energized to create a rotating magnetic field around the shaft. This rotating magnetic field couples with the field of the magnets 62-68 which form the rotor of the motor to cause rotation of shaft 16. The control of the rate of rotation of the magnetic field controls motor speed.

In an environment of this nature, it is very important to control the flow of heat to the electric motor and limit the peak temperatures reached by the motor. The principal source of heat is the internal combustion engine exhaust which arrives at the turbocharging system in scroll 18. The scroll is directly mounted on the bearing housing 30, but the mounting is configured to be of minimum area to reduce the heat transfer from the scroll to the housing. The annular oil passage 38 is directly outside of the motor laminations, and it is this oil flow which removes most of the heat which gets into the housing 30. The annular passage is close to the motor, and the flow therethrough is adequate to limit temperatures when the system is in equilibrium operation. The thermal insulator 60 reduces heat transfer to and through the rotor magnets. In addition, the gas turbine impeller 20 is preferably mounted on a thermal insulator cup 90, which is wrapped onto the gas turbine end of the shaft 16, as seen in FIG. 1. The provision of thermal insulation under the turbine rotor and under the motor rotor magnets, together with oil cooling by continuous oil circulation, is sufficient to hold down the temperature of the motor during substantially equilibrium conditions.

Another problem arises when the system is shut down after having been run at a reasonable load equilibrium condition. There is considerable thermal mass in the gas turbine scroll 18 and in its rotor 20, and this has been operating at exhaust gas temperature. The scroll is mechanically connected to the exhaust system of the engine which is also hot. The turbine outlet is connected to a muffler, but exhaust pipes are traditionally of thin-wall structure and, thus, cannot conduct much heat away. With a shutdown, the heat in the thermal mass of the exhaust gas turbine scroll principally passes into the bearing and motor housing 30 to raise the temperature thereof. This soaking of heat into the bearing housing and motor may raise it to unacceptably high temperatures if the heat is not otherwise discharged. The Curie point of the magnets must not be surpassed, and the Curie point depends upon the material. More expensive materials have higher Curie points. Thus, limiting the temperature also permits the use of a less expensive magnet material. Both the insulator under the gas turbine impeller and the insulation 60 under the magnets limit the magnet temperature.

In a presently preferred embodiment, it is desirable to provide an air passage 90' through the center of the shaft 16. Motor 92 drives air pump 94, which draws air through screen 96. The screen may be a conventional air filter. The air pump delivers air through downward oriented check valve 98 and through arm 100 to nozzle 102. The nozzle 102 delivers air through the air passage 90' to exhaust out of the end of the shaft into exhaust pipe 22. This moves heat out of the shaft in a direction opposite the direction in which the heat is soaking into the shaft from the gas turbine scroll.

While this cooling system of providing air through the hollow shaft is principally necessary upon shutdown to prevent the heat soaking into the bearing housing from raising the electric motor temperature too high, since it is installed, it may also be operated during running of the turbocharging system. Since compressed air is available from the air compressor 14, it is tapped from the scroll 26 and delivered through check valve 104 to tee 106 where the flow joins the passage down through arm 100. The purpose of the check valves 98 and 104 is to prevent the air pump 94 from delivering air to the scroll at times of shutdown of the turbocharging system and prevent the scroll from delivering air to the air pump 94 at the time of operation of the turbocharging system. As stated above, the use of this hollow shaft and its air flow cooling system is not necessarily dependent upon the other heat flow control and temperature limiting structure. Thus, either may be used independently.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A structure for an internal combustion engine turbocharging system comprising:

a housing, said housing having first and second spaced bearings therein, a shaft extending through said housing and through said bearings from a first end to a second end, said shaft having an opening therethrough from said first end to said second end, said shaft being configured so that an air compressor can be mounted on said first end of said shaft and an exhaust gas turbine can be mounted on said second end of said shaft to rotatably drive said shaft in said bearings;

an electric motor mounted in said housing between said bearings, said electric motor having a rotor mounted on said shaft and a stator fixed in said housing;

means for energizing said electric motor for maintaining rotation of said shaft at a preselected minimum speed, even though insufficient exhaust gas is supplied to the turbine to maintain such preselected minimum speed, such minimum speed being preselected to provide charge air to an engine over and above that amount of charge air which could be provided by the exhaust gas turbine alone; and means for passing fluid through said opening through said shaft even when said shaft is not rotating to remove heat from said rotor of said motor.

2. The structure of claim 1 wherein said housing has fluid passages therein adjacent said stator to cool said stator.

3. The structure of claim 2 wherein said passages are oil passages and said oil passages are also connected to lubricate said bearings.

4. The structure of claim 1 wherein said motor rotor is mounted on said shaft and including thermal insulation between said rotor and said shaft.

5. The structure of claim 4 wherein said motor rotor comprises a plurality of magnets, each shaped substantially as a longitudinal segment of a cylindrical tube.

6. The structure of claim 5 wherein a collar is mounted on said shaft adjacent each end of said rotor magnets, said collar embracing said rotor magnets to hold them on said shaft.

7. The structure of claim 6 further including a collar around said magnets substantially at the center thereof.

8. The structure of claim 1 wherein there is a gas turbine rotor mounted on said second end of said shaft and further including thermal insulation positioned between said gas turbine rotor and said second end of said shaft to inhibit heat transfer from said gas turbine rotor into said shaft.

9. The structure of claim 8 wherein said means for passing fluid through said opening comprises an air pump so that air can be supplied through said shaft even when said shaft is not rotating.

10. The structure of claim 1 wherein said opening through said shaft from said first end to said second end thereof is an air passage and there is means for supplying air through said air opening to reduce the amount of heat conducted from said second end of said shaft to said rotor.

11. The structure of claim 10 wherein said means for supplying air through said air passage is an air jet adjacent one end of said opening through said shaft.

12. A structure for an internal combustion engine turbocharging system comprising:

a housing, said housing having first and second spaced bearings therein, a shaft extending through said housing and through said bearings from a first end to a second end so that an air compressor can be mounted on said first end of said shaft and an exhaust gas turbine can be mounted on said second end of said shaft to rotatably drive said shaft in said bearings;

an electric motor mounted in said housing between said bearings, said electric motor having a rotor mounted on said shaft and a stator fixed in said housing, oil passages in said housing adjacent said stator to cool said stator, said oil passages also being connected to lubricate said bearings, separating means between said rotor and said bearings to inhibit bearing oil from passing to said rotor; and means for energizing said electric motor for maintaining rotation of said shaft at a preselected minimum speed, even though insufficient exhaust gas is supplied to the turbine to maintain such preselected minimum speed, such minimum speed being preselected to provide charge air to an engine over and above that amount of charge air which could be provided by the exhaust gas turbine alone.

13. The structure of claim 12 wherein said separating means comprises an oil slinger mounted on said shaft.

14. The structure of claim 12 wherein said separating means comprises a seal interconnecting said shaft and said housing.

15. The structure of claim 14 wherein said separating means also includes an oil slinger mounted on said shaft to rotate with said shaft.

16. A structure for an internal combustion engine turbocharging system comprising:

a housing, said housing having first and second spaced bearings therein, a shaft extending through said housing and through said bearings from a first end to a second end so that an air compressor can be mounted on said first end of said shaft and an exhaust gas turbine can be mounted on said second end of said shaft to rotatably drive said shaft in said bearings;

an electric motor mounted in said housing between said bearings, said electric motor having a rotor mounted on said shaft, said motor rotor comprising a plurality of magnets, each of said plurality of magnets shaped substantially as a longitudinal segment of a cylindrical tube, thermal insulation between said magnets and said shaft, a collar mounted on said shaft adjacent each end of said rotor magnet, said collars embracing said rotor magnets to hold them on said shaft, said collar at each end of said shaft also carrying a seal thereon, each said seal cooperating with said housing to inhibit fluid escape from said housing adjacent said seal, a stator fixed in said housing;

means for energizing said electric motor for maintaining rotation of said shaft at a preselected minimum speed, even though insufficient exhaust gas is supplied to the turbine to maintain such preselected minimum speed, such minimum speed being preselected to provide charge air to an engine over and above that amount of charge air which could be provided by the exhaust gas turbine alone.

17. A structure for an internal combustion engine turbocharging system comprising:

a housing, said housing having first and second spaced bearings therein, a shaft extending through said housing and through said bearings from a first end to a second end so that an air compressor can be mounted on said first end of said shaft and an exhaust gas turbine can be mounted on said second end of said shaft to rotatably drive said shaft in said bearings;

an electric motor mounted in said housing between said bearings, said electric motor having a rotor mounted on said shaft, said motor stator comprising a plurality of magnets, each of said magnets being shaped substantially as a longitudinal segment of a cylindrical tube, a collar mounted on said shaft adjacent each end of said rotor magnets, said collar embracing said rotor magnets to hold them on said shaft, each of said collars carrying an oil slinger thereon, a stator fixed in said housing;

means for energizing said electric motor for maintaining rotation of said shaft at a preselected minimum speed, even though insufficient exhaust gas is supplied to the turbine to maintain such preselected minimum speed, such minimum speed being preselected to provide charge air to an engine over and above that amount of charge air which could be provided by the exhaust gas turbine alone.

18. A turbocharging system comprising:
- a housing, said housing having a first end and a second end, said housing having a shaft extending therethrough, first and second spaced bearings mounted in said housing, said shaft extending through said bearings so that said shaft is rotatably mounted on said bearings, said shaft extending out of both said first and said second ends of said housing, said shaft having an opening therethrough from said first end to said second end;
- an air compressor scroll mounted on said first end of said housing and an air compressor rotor mounted on said first end of said shaft so that said air compressor scroll can be connected to supply charging air to an internal combustion engine;
- an exhaust gas scroll mounted on said second end of said housing and an exhaust gas turbine rotor mounted on said second end of said shaft so that said exhaust gas scroll can be connected to receive exhaust gas from an internal combustion engine and drive said shaft, said housing having passages therein for connection of a lubricant fluid supply thereto for lubricating said bearings in said housing and having connections thereto for draining lubricant from said housing; and
- an electric motor, said electric motor having a rotor attached to said shaft between said first and second spaced bearings and having a stator within said housing;
- means connected to said electric motor for maintaining a selected minimum rotational speed of said shaft even when exhaust gas flow is insufficient to maintain such selected speed, said lubricant fluid passages being positioned with respect to said stator to cool said stator; and
- means for passing fluid through said opening through said shaft even when said shaft is not rotating to remove heat from said rotor of said motor.

19. The turbocharging system of claim 18 wherein said means for maintaining a selected minimum rotational speed is for providing enough charge air to an engine to significantly reduce uncombusted hydrocarbons and exhaust smoke.

20. The turbocharging system of claim 18 wherein said lubricant passages include an annulus around said stator.

21. The turbocharging system of claim 18 wherein said rotor comprises a plurality of magnets on said shaft, each of said magnets being formed as a longitudinal segment of a cylindrical tube.

22. The turbocharging system of claim 21 wherein there is a collar on said shaft adjacent each end of said rotor, said collar embracing said magnets to hold said magnets onto said shaft.

23. The turbocharging system of claim 22 wherein there is a further collar around said magnets adjacent the center thereof.

24. The turbocharging system of claim 21 wherein there is thermal insulation positioned between said magnets and said shaft to inhibit heat in said shaft from passing to said magnets.

25. The turbocharging system of claim 18 wherein there is a gas turbine rotor mounted on said second end of said shaft with thermal insulation between said gas turbine rotor and said shaft to inhibit heat transfer from said rotor to said motor.

26. The turbocharging system of claim 25 wherein said rotor comprises a plurality of magnets on said shaft, each of said magnets being formed as a longitudinal segment of a cylindrical tube.

27. The turbocharging system of claim 26 wherein there is a collar on said shaft adjacent each end of said rotor, said collar embracing said magnets to hold said magnets onto said shaft.

28. The turbocharging system of claim 27 wherein there is a further collar around said magnets adjacent the center thereof.

29. The turbocharging system of claim 26 wherein there is thermal insulation positioned between said magnets and said shaft to inhibit heat in said shaft from passing to said magnets.

30. The turbocharging system of claim 18 wherein said opening through said shaft from said first end to said second end thereof is an air passage and there is means for supplying air through said air passage to reduce the amount of heat conducted from said second end of said shaft to said rotor.

31. The turbocharging system of claim 30 wherein said means to supply air through said air passage is an air jet adjacent one end of said opening through said shaft.

32. The turbocharging system of claim 31 wherein said means to supply air through said air opening comprises an air nozzle and a source of air under pressure connected to said nozzle to blow air from said nozzle through said air opening.

33. A turbocharging system comprising:
- a housing, said housing having a first end and a second end, said housing having a shaft extending therethrough, first and second spaced bearings mounted in said housing, said shaft extending through said bearings so that said shaft is rotatably mounted on said bearings, said shaft extending out of both said first and said second ends of said housing;
- an air compressor scroll mounted on said first end of said housing and an air compressor rotor mounted on said first end of said shaft so that said compressor scroll can be connected to supply charging air to an internal combustion engine;
- an exhaust gas scroll mounted on said second end of said housing and an exhaust gas turbine rotor mounted on said second end of said shaft so that said exhaust gas scroll can be connected to receive exhaust gas from an internal combustion engine and drive said shaft, said housing having passages therein for connection of a lubricant fluid supply thereto for lubricating said bearings in said housing and having connections thereto for draining lubricant from said housing; and
- an electric motor, said electric motor having a rotor attached to said shaft between said first and second spaced bearings, means between said first bearing and said rotor and between said second bearing and said rotor for inhibiting oil flow from said first and second bearings to said rotor, a stator within said housing; and
- means connected to said electric motor for maintaining a selected minimum rotational speed of said shaft even when exhaust gas flow is insufficient to maintain such selected speed, said lubricant fluid passages being positioned with respect to said stator to cool said stator to cool said stator.

34. The turbocharging system of claim 33 wherein said means for inhibiting oil flow to said rotor includes a seal.

35. The turbocharging system of claim 34 wherein said means to inhibit oil flow to said rotor includes an oil slinger.

36. The turbocharging system of claim 35 wherein said means to inhibit oil flow to said rotor includes an oil slinger.

37. A turbocharging system comprising:

a housing, said housing having a first end and a second end, said housing having a shaft extending therethrough, first and second spaced bearings mounted in said housing, said shaft extending through said bearings so that said shaft rotatably mounted on said bearings, said shaft extending out of both said first and said second ends of said housing;

an air compressor scroll mounted on said first end of said housing and an air compressor rotor mounted on said first end of said shaft so that said air compressor scroll can be connected to Supply charging air to an internal combustion engine;

an exhaust gas scroll mounted on said second end of said housing and an exhaust gas turbine rotor mounted on said second end of said shaft so that said exhaust gas scroll can be connected to receive exhaust gas from an internal combustion engine and drive said shaft, said housing having passages therein for connection of a lubricant fluid supply thereto for lubricating said bearings in said housing and having connections thereto for draining lubricant from said housing; and an electric motor, said electric motor having a rotor attached to said shaft between said first and second spaced bearings, said rotor comprising a plurality of magnets on said shaft, each of said magnets being formed as a longitudinal segment of a cylindrical tube, a collar on said shaft adjacent each end of said rotor, said collar embracing said magnets to hold said magnets onto said shaft, an oil slinger on each of said collars to inhibit oil flow from said bearings to said rotor, a stator within said housing; and means connected to said electric motor for maintaining a selected minimum rotational speed of said shaft even when exhaust gas flow is insufficient to maintain such selected speed said lubricant fluid passages being positioned with respect to said stator to cool said stator.

38. A turbocharging system comprising;

a housing, said housing having a first end and a second end, said housing having a shaft extending therethrough, first and second spaced bearings mounted in said housing, said shaft extending through said bearings so that said shaft is rotatably mounted on said bearings, said shaft extending out of both said first and said second ends of said housing;

an air compress or scroll mounted on said first end of said housing and an air compressor rotor mounted on said first end of said shaft so that said air compressor scroll can be connected to supply charging air to an internal combustion engine;

an exhaust gas scroll mounted on said second end of said housing and an exhaust gas turbine rotor mounted on said second end of said shaft so that said exhaust gas scroll can be connected to receive exhaust gas from an internal combustion engine and drive said shaft, said housing having passages therein for connection of lubricant fluid supply thereto for lubricating said bearings in said housing and having connections thereto for draining lubricant from said housing; and an electric motor, said electric motor having a rotor attached to said shaft between said first and second spaced bearings, said rotor comprising a plurality of magnets on said shaft, each of said magnets being formed as a longitudinal segment of a cylindrical tube, a collar on said shaft adjacent each end of said rotor, said collar embracing said magnets to hold said magnets onto said shaft, an oil seal on each of said collars to inhibit oil flow from said bearings to said rotor, a stator within said housing; and means connected to said electric motor for maintaining a selected minimum rotational speed of said shaft even when exhausts gas flow is insufficient to maintain such selected speed said lubricant fluid passages being positioned with respect to said stator to cool said stator.

39. A turbocharging system comprising:

a housing, said housing having a first end and a second end, said housing having a shaft extending therethrough, first and second spaced bearings mounted in said housing, said shaft extending through said bearings so that said shaft is rotatably mounted on said bearings, said shaft extending out of both said first and said second ends of said housing;

an air compressor scroll mounted on said first end of said housing and an air compressor rotor mounted on said first end said shaft with terminal insulation between said gas turbine rotor and said shaft to inhibit heat transfer from said rotor so that said air compressor scroll can be connected to supply charging air to an internal combustion engine;

an exhaust gas scroll mounted on said second end of said housing and an exhaust gas turbine rotor mounted on said second end of said shaft so that said exhaust gas scroll can be connected to receive exhaust gas from an internal combustion engine and drive said shaft, said housing having passages therein for connection of a lubricant fluid supply thereto for lubricating said bearings in said housing and having connections thereto for draining lubricant from said housing; and an electric motor, said electric motor having a rotor attached to said shaft between said first and second spaced bearings, said rotor comprising a plurality of magnets on said shaft, each of said magnets being formed as a longitudinal segment of a cylindrical tube, a collar on said shaft adjacent each end of said rotor, said collar embracing said magnets to hold said magnets onto said shaft, an oil slinger on each of said collars to inhibit oil flow from said bearings to said rotor, a stator within said housing; and means connected to said electric motor for maintaining a selected minimum rotational speed of said shaft even when exhaust gas flow is insufficient to maintain such selected speed said lubricant fluid passages being positioned with respect to said stator to cool said stator.

40. A turbocharging system comprising:

a housing, said housing having a first end and a second end, said housing having a shaft extending therethrough, first and second spaced bearings mounted in said housing, said shaft extending through said bearings so that said shaft is rotatably mounted on said bearing said shaft extending out of both said first and said second ends of said housing;

an air compressor scroll mounted on said first end of said housing and an air compressor rotor mounted on said first end of said shaft with thermal insulation between said gas turbine rotor and said shaft to inhibit heat transfer from said rotor so that said air compressor scroll can be connected to supply charging air to an internal combustion engine;

an exhaust gas scroll mounted on said second end of said housing and an exhaust gas turbine rotor mounted on said second end of said shaft so that said exhaust gas scroll can be connected to receive exhaust gas from an internal combustion engine and drive said shaft, said housing having passages therein for connection of a lubricant fluid supply thereto for lubricating said bearings in said housing and having connections thereto for draining lubricant from said housing; and an electric motor, said electric motor having a rotor attached to said shaft between said first and second spaced bearings, said rotor comprising a plurality of magnets on said shaft, each of said magnets being formed as a longitudinal segment of a cylindrical tube, a collar on said shaft adjacent each end of said rotor, said collar embracing said magnets to hold said magnets onto said shaft, an oil seal on each of said collars to inhibit oil flow from said bearings to said rotor, a stator within said housing; and means connected to said electric motor for maintaining a selected minimum rotational speed of said shaft even when exhaust gas flow is insufficient to maintain such selected speed, said lubricant fluid passages being positioned with respect to said stator to cool said stator.

* * * * *